US009183617B2

(12) United States Patent
Goh et al.

(10) Patent No.: US 9,183,617 B2
(45) Date of Patent: Nov. 10, 2015

(54) METHODS, DEVICES, AND COMPUTER READABLE MEDIUMS FOR PROCESSING A DIGITAL PICTURE

(75) Inventors: Kwong Huang Goh, Singapore (SG); Jo Yew Tham, Singapore (SG); Zaw Min Oo, Singapore (SG); Wei Siong Lee, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 541 days.

(21) Appl. No.: 13/504,430

(22) PCT Filed: Oct. 29, 2010

(86) PCT No.: PCT/SG2010/000420
§ 371 (c)(1),
(2), (4) Date: Sep. 17, 2012

(87) PCT Pub. No.: WO2011/053255
PCT Pub. Date: May 5, 2011

(65) Prior Publication Data
US 2013/0004096 A1 Jan. 3, 2013

(30) Foreign Application Priority Data
Oct. 30, 2009 (SG) .................. 200907246-3

(51) Int. Cl.
*G06K 9/40* (2006.01)
*G06T 5/00* (2006.01)
(Continued)

(52) U.S. Cl.
CPC .............. *G06T 5/002* (2013.01); *H04N 19/117* (2014.11); *H04N 19/137* (2014.11); *H04N 19/139* (2014.11); *H04N 19/14* (2014.11); *H04N 19/176* (2014.11); *H04N 19/61* (2014.11); *H04N 19/615* (2014.11); *H04N 19/63* (2014.11);
(Continued)

(58) Field of Classification Search
USPC ......... 382/176, 199, 224, 236, 238, 239, 260, 382/263, 264
See application file for complete search history.

(56) References Cited

U.S. PATENT DOCUMENTS

| 5,424,783 A | 6/1995 | Wong |
| 5,847,772 A | 12/1998 | Wells |
| 5,933,540 A | 8/1999 | Lakshminarayanan et al. |
| 5,959,693 A | 9/1999 | Wu et al. |

(Continued)

FOREIGN PATENT DOCUMENTS

| EP | 1480463 | 11/2004 |
| WO | WO2007089803 A2 | 8/2007 |

OTHER PUBLICATIONS

Cheng, et al., Analysis and VLSI Architecture of Update Step in Motion-Compensated Temporal Filtering, 5343, ISCAS, 2006.
(Continued)

*Primary Examiner* — Phuoc Tran
(74) *Attorney, Agent, or Firm* — K. David Crockett, Esq.; Niky Economy Syrengelas, Esq.; Crockett & Crockett, PC

(57) ABSTRACT

Embodiments provide a method for processing a digital picture, wherein the digital picture comprises a plurality of pixels. The method comprises dividing the digital picture into a plurality of blocks, each block comprising a plurality of pixels. The method further comprises determining a type of block for each block. The method further comprises associating each block with a filtering mode of a plurality of different filtering modes according to the type determined for the block. The method further comprises filtering each block using the associated filtering mode associated with the block.

14 Claims, 16 Drawing Sheets

(51) Int. Cl.

| | | |
|---|---|---|
| *H04N 19/139* | (2014.01) | |
| *H04N 19/176* | (2014.01) | |
| *H04N 19/63* | (2014.01) | |
| *H04N 19/61* | (2014.01) | |
| *H04N 19/117* | (2014.01) | |
| *H04N 19/14* | (2014.01) | |
| *H04N 19/137* | (2014.01) | |
| *H04N 19/80* | (2014.01) | |
| *H04N 19/85* | (2014.01) | |
| *H04N 19/615* | (2014.01) | |
| *H04N 19/13* | (2014.01) | |

(52) U.S. Cl.
CPC .............. *H04N 19/80* (2014.11); *H04N 19/85* (2014.11); *G06T 2207/10016* (2013.01); *G06T 2207/20012* (2013.01); *G06T 2207/20021* (2013.01); *G06T 2207/20182* (2013.01); *H04N 19/13* (2014.11)

(56) References Cited

U.S. PATENT DOCUMENTS

| | | | |
|---|---|---|---|
| 5,974,192 | A | 10/1999 | Kundu |
| 6,094,231 | A | 7/2000 | Wischer-Mann |
| 6,281,942 | B1 | 8/2001 | Wang |
| 6,834,124 | B1 | 12/2004 | Lin et al. |
| 6,882,754 | B2 | 4/2005 | Hayashi |
| 7,064,793 | B2 | 6/2006 | Hahn et al. |
| 7,088,351 | B2 | 8/2006 | Wang |
| 7,110,455 | B2 | 9/2006 | Wu et al. |
| 7,199,838 | B2 | 4/2007 | Lin et al. |
| 7,265,784 | B1 | 9/2007 | Frank |
| 7,289,562 | B2 | 10/2007 | Yan et al. |
| 7,430,335 | B2 | 9/2008 | Dumitras et al. |
| 7,542,095 | B2 | 6/2009 | Zhou et al. |
| 7,724,307 | B2 | 5/2010 | Wan et al. |
| 7,724,979 | B2 | 5/2010 | Drezner et al. |
| 7,729,555 | B2 | 6/2010 | Chen et al. |
| 7,734,110 | B2 | 6/2010 | Bosco et al. |
| 7,734,115 | B2 | 6/2010 | Kang et al. |
| 7,742,652 | B2 | 6/2010 | Oh et al. |
| 7,769,089 | B1 | 8/2010 | Chou |
| 7,773,271 | B2 | 8/2010 | Yamada et al. |
| 7,783,124 | B2 | 8/2010 | Chen et al. |
| 7,787,154 | B2 | 8/2010 | Fan et al. |
| 7,792,381 | B2 | 9/2010 | Rhee |
| 7,804,896 | B2 | 9/2010 | Chiu et al. |
| 2003/0112412 | A1* | 6/2003 | Han et al. .......... 352/44 |
| 2004/0258318 | A1* | 12/2004 | Yu et al. .......... 382/239 |
| 2006/0280253 | A1 | 12/2006 | Tourapis et al. |
| 2008/0260040 | A1 | 10/2008 | Ouyang et al. |

OTHER PUBLICATIONS

Karunakar, Motion-Compensated Temporal Filtering with Optimized Motion Estimation, 4:329, J. Real-Time Image Proc, 2009.
Motion Compensated Filtering, provided Jul. 2012.
McCarthy, et al., Performance of Temporal Filters for Optical Flow Estimation in Mobile Robot Corridor Centring and Visual Odometry, 2003.
Fuchs, et al., A Shaped Temporal Filter Camera, 2009.
Istrail, An Overview of Clustering Methods, provided Jul. 2012.

* cited by examiner (a)

| Sequence | Bit-rate (kbs) of original noisy sequence | Bit-rate reduction (BBR) % |
|---|---|---|
| ice-skating | 7009 | 87.7 |
| akiyo | 6624 | 94 |
| mobile | 10464 | 27.6 |
| bus | 8173 | 71.3 |
| foreman | 7447 | 84.3 |

METHODS, DEVICES, AND COMPUTER READABLE MEDIUMS FOR PROCESSING A DIGITAL PICTURE

The present application claims the benefit of the Singapore patent application 200907246-3 (filed on 30 Oct. 2009), the entire contents of which are incorporated herein by reference for all purposes.

TECHNICAL FIELD

Embodiments relate generally to methods and devices for processing a digital picture.

BACKGROUND

Noise may be added to a digital picture or a video sequence of digital pictures from various sources in different processing stages. For example, noise may be introduced during the acquisition process because of imperfections of capturing devices and poor lightning conditions. Noise can cause not only visual degradation of video sequences of digital pictures but also the reduction of coding efficiency in encoding process of the video sequences of digital pictures. The noise reduction process can be highly computational in some methods, and integrating a complex noise reduction method into a software based real-time video encoder may not be practical. There is also a need to reduce noise without generating any visual artifacts.

Various noise filtering techniques have been developed. Such noise filtering techniques include non-motion compensated type filtering and motion compensated type filtering.

Non-motion compensated technique does not require computationally extensive motion compensation process, and it usually assumes some kind of stationary, spatial or temporal information, or both, in sequences, or include motion information by adapting weighting of filtering coefficients. Non-motion compensated noise reduction methods generally do not make use of the advantage of temporal filtering.

On the other hand, the motion compensated algorithms exploit temporal correlation between video frames (digital pictures) in filtering, where temporal filtering is performed on motion compensated pixels. However, simply applying motion compensation to whole frames (digital pictures) may cause artifacts in parts of the video scene, especially stationary scene, due to inconsistencies in motion information obtained.

To counter this problem of motion compensated algorithms, adaptive motion compensated filtering is performed by detecting the difference between same position blocks of frames (digital pictures) of the video scene. Segmentation of object and background on a digital picture is applied before motion compensation is applied to object, and temporal filtering is applied to the background thereafter.

However, the motion compensated techniques generally need computationally expensive motion information finding process prior to filtering. Further, temporal filtering for homogeneous region cannot reduce noise effectively. Another problem in existing noise reduction methods is the lost of details for edge and textural region of the picture.

SUMMARY OF THE INVENTION

Various embodiments provide a method for processing a digital picture which solves at least partially the above mentioned problems.

In one embodiment, a method for processing a digital picture is provided, wherein the digital picture comprises a plurality of pixels. The method may include dividing the digital picture into a plurality of blocks. Each block may include a plurality of pixels. The method may further include determining a type of block for each block. The method may further include associating each block with a filtering mode of a plurality of different filtering modes according to the type determined for the block. The method may further include filtering each block using the associated filtering mode associated with the block.

In one embodiment, a method for processing a sequence of digital pictures is provided. The method may include obtaining motion information based on a motion estimation between a first digital picture and a second digital picture of the sequence of digital pictures. The method may further include filtering a third digital picture of the sequence of digital pictures based on the motion information.

According to other embodiments, devices and computer readable mediums according to the methods described above are provided.

It should be noted that the embodiments described in the dependent claims of the independent method claim are analogously valid for the corresponding device and computer readable medium claim where applicable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 (b) illustrates that the digital picture shown in FIG. 2 (a) is divided into a plurality of blocks and classified into different types;

FIG. 3 (b) shows alternative relative positions of pixels that may be used by a spatial filter;

FIG. 4 (b) illustrates that a similarity check is performed for each pixel of the block of homogeneous type before motion compensated temporal filtering is applied in one embodiment;

FIG. 5 (b) illustrates that a similarity check is performed for each pixel of the block of texture type before motion compensated temporal filtering is applied in one embodiment;

FIG. 8 (b) illustrates that for similarity check, a pixel is determined to be similar or dissimilar with the corresponding pixel in the temporally preceding digital picture based on motion map values corresponding to the pixel and its adjacent pixels on the motion map according to one embodiment;

FIG. 15 (b) shows the filtered digital picture that corresponds t the noisy digital picture shown in FIG. 15 (a);

FIG. 16 (b) shows the filtered digital picture that corresponds t the noisy digital picture shown in FIG. 16 (a); and FIG. 17 shows a table illustrating the bit-rate reduction (BRR) achieved by the method of processing a digital picture as described herein.

DESCRIPTION

The following detailed description refers to the accompanying drawings that show, by way of illustration, specific details and embodiments in which the invention may be practiced. These embodiments are described in sufficient detail to enable those skilled in the art to practice the invention. In this regard, directional terminology, such as "top", "bottom", "front", "back", "leading", "trailing", etc, is used with reference to the orientation of the Figure(s) being described. Because components of embodiments can be positioned in a number of different orientations, the directional terminology is used for purposes of illustration and is in no way limiting. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

It is noted that human perceives the level of noise in a digital picture differently depending on content of the surrounding neighborhoods. For example, noise is generally more obvious in homogenous areas while less conceivable on texture areas. In this context, homogeneous area refers to the area in the digital picture where there is no visibly noticeable change of color or brightness or only minor changes caused by noise. Texture area refers to the area in the digital picture where there is visibly noticeable repetition of change of colors or brightness compared with the homogeneous area. Example of texture area in a digital picture is the repetition of a fixed geometric shape such as a circle or square. Another example of texture area in a digital picture is the changing patterns with fixed statistical properties. Based on this, in one embodiment, in order to reduce noise in a digital picture, the digital picture may be divided into a plurality of blocks, and a block type may be determined for each block, e.g. a homogeneous type and texture type. Different filtering modes may be applied to the pixels of each block according to the type of the block such that noise in the digital picture may be reduced while reserving details of the digital picture.

Figure 1:
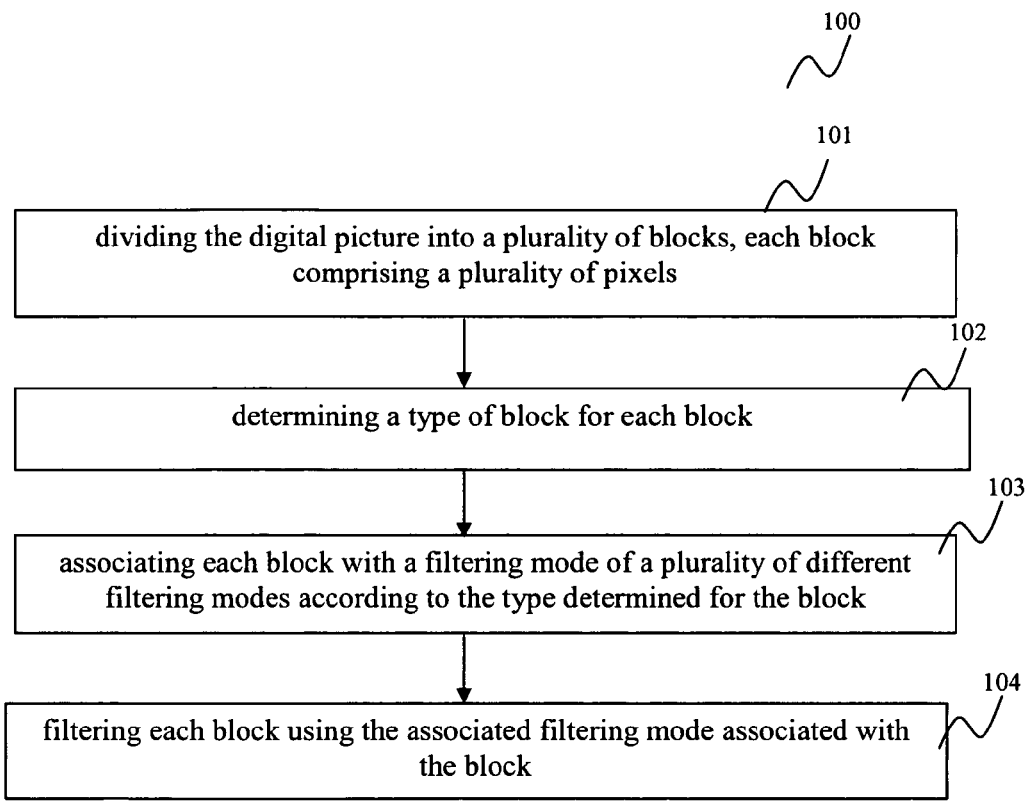
FIG. 1 shows a method for processing a digital picture in one embodiment.

FIG. 1 illustrates a method 100 for processing a digital picture in one embodiment. The method 100 may be used to reduce noise in the digital picture which comprises a plurality of pixels. The method 100 may include 101 dividing the digital picture into a plurality of blocks, wherein each block comprises a plurality of pixels. The method 100 may further include 102 determining a type of block for each block. The method 100 may further include 103 associating each block with a filtering mode of a plurality of different filtering modes according to the type determined for the block. The method 100 may further include 104 filtering each block using the associated filtering mode associated with the block.

In other words, in one embodiment, a digital picture may first be divided into a plurality of blocks wherein each block comprises a plurality of pixels. Then a type of block is determined for each block. For example, there may be a plurality of pre-determined types of block, and each block may be determined to be one of the plurality of types according to a predetermined criterion. Further, each block may be associated with a filtering mode based on the type of the block. That is, for example, a block that is of homogeneous type may be associated with a homogeneous filtering mode, and a block that is of texture type may be associated with a texture filtering mode. Thereafter, each block may be filtered using the associated filtering mode that is associated with the block.

In one embodiment, the digital picture is a digital picture of a video sequence of digital pictures. Accordingly, the method 100 may be used to reduce noise in a video sequence of digital pictures.

In one embodiment, a plurality of types of block may be predefined. A criterion may be set to classify each block into one of the predefined types of block. For example, in one embodiment, the type of a block may be determined based on a characteristic value of the block. For example, the characteristic value may be a contrast value of the pixels in each block. For example, the contrast value of a block may be calculated as follows. Firstly, a mean pixel value of all the pixels within the block may be calculated. Then the pixels may be divided into two sub-groups, e.g. a first sub-group including the pixels with pixel values below or equal to the mean pixel value, and a second sub-group including the pixels with pixel values above the mean pixel value. It is understood that the pixels may alternatively be divided into two sub-groups with a first sub-group including the pixels with pixel values below the mean pixel value of the block and a second sub-group including the pixels with pixels values above the mean pixel value of the block. For each sub-group, a mean pixel value may be further calculated. Thereafter, a contrast of the two sub-groups of pixels may be calculated based on the mean pixel value of the first sub-group and the mean pixel value of the second sub-group. This contrast value of the two sub-groups of pixels may represent the contrast of the block.

In one exemplary embodiment, there may be three predetermined types of blocks, i.e. an homogeneous type, a texture type, and an edge type.

In a more concrete embodiment, a block may be determined to be of an edge type if the characteristic value of the block is larger than a first threshold. The block may be determined to be of a texture type if the characteristic value of the block is between the first threshold and a second threshold. The second threshold is smaller than the first threshold. The block may be determined to be of a homogeneous type if the characteristic value of the block is smaller than the second threshold. Both the first and second thresholds may be predetermined. In the embodiment where the characteristic value is a contrast value of the pixels in each block, a block of a homogeneous type generally refers to a block which comprises pixels having the same or approximately the same pixel values (e.g. having pixel values such as luminance and/or chrominance values that differ only by a value below a predetermined threshold) such that, for example, the color or brightness of pixels in the block is the same or only varies in a minor extent and is generally not visibly noticeable. A block of a texture type, compared with the block of homogeneous type, generally comprises pixels having pixel values being varied to a larger extent and is visibly noticeable. A block of an edge type generally comprises pixels that vary to an even larger extent compared with the block of a texture type.

In one embodiment, each block that is determined to be of an edge type is associated with an edge filtering mode. Each block that is determined to be of a texture type is associated with a texture filtering mode. Each block that is determined to be of a homogeneous type is associated with a homogeneous filtering mode. That is, different types of blocks are associated with different filtering modes.

In one embodiment, filtering the blocks being associated with the texture filtering mode or homogeneous filtering mode includes applying spatial filtering to the blocks being associated with the texture filtering mode or homogeneous filtering mode. In a further embodiment, blocks being associated with the texture filtering mode are spatially filtered in a less degree compared with the blocks being associated with the homogeneous filtering mode. This is advantageous in that texture blocks are more tolerable with noise and have more details, and hence spatial filtering of the blocks being associated with texture filtering mode to a less extent may prevent losing too much details by the filtering process.

In one embodiment, filtering each block of the digital picture includes applying motion compensated temporal filtering to the block. Temporal filtering generally refers to filtering of a digital picture by averaging pixel values of pixels of the digital picture and pixel values of corresponding pixels in the same spatial position of another digital picture which is temporally in sequence with the digital picture. Motion compensated temporal filtering generally refers to the filtering along moving object trajectories, wherein pixels of another different digital pictures for example correspond to each other if they show the same picture content, e.g. the same (part of an) object if proper motion compensation process is applied.

In a further embodiment, applying motion compensated temporal filtering to each block includes determining, for each pixel of the block, whether the pixel is similar to a corresponding pixel in a temporally preceding digital picture according to a first similarity criterion. In this context, a corresponding pixel in a temporally preceding digital picture may for example refer to the pixel in the temporally preceding digital picture that represents a same spatial position as the pixel in the current digital picture does. In other words, a corresponding pixel in the temporally preceding digital picture has the same spatial coordinates as the pixel in the current digital picture has. In one embodiment, applying motion compensated temporal filtering to each block further includes applying motion compensated temporal filtering to the block for the pixels in the block which are determined to be similar with the corresponding pixels in the temporally preceding digital picture according to the first similarity criterion.

In an exemplary embodiment, the determination for each pixel of the block of whether the pixel is similar to the corresponding pixel in the temporally preceding digital picture is based on a similarity check for the pixel with reference to the corresponding pixel in the temporally preceding digital picture. In a further embodiment, the similarity check includes producing a motion map of the digital picture by differencing pixels of the digital picture with corresponding pixels from the temporally preceding digital picture. The motion map may have a plurality of motion map values, and each motion map value may be associated to a pixel of the digital picture. Each motion map value may be set to be a first number if the associated pixel is determined to be similar to the corresponding pixel in the temporally preceding digital picture according to a second similarity criterion, and each map value may be set to be a second number if the associated pixel is determined to not be similar with the corresponding pixel in the temporally preceding digital picture according to the second similarity criterion. The similarity check may further include determining, for each pixel, whether the pixel is similar with the corresponding pixel in the temporally preceding digital picture according to the first similarity criterion which is based on the motion map value associated with the pixel and motion map values associated with pixels adjacent to the pixel.

In one embodiment, according to the first similarity criterion, for each pixel, a sum of the motion map value associated with the pixel and motion map values associated with pixels adjacent to the pixel is compared with a third threshold. Further according to the first similarity criterion, the pixel is determined to be similar to the corresponding pixel in the temporally preceding digital picture if the sum is larger than the third threshold, and the pixel is determined not to be similar to the corresponding pixel in the temporally preceding digital picture if the sum is smaller than the third threshold. The third threshold may be predetermined.

In one embodiment, according to the second similarity criterion, for each pixel, a difference value between the pixel and the corresponding pixel in the temporally preceding digital picture is determined. Further according to the second criterion, the pixel is determined to be similar to the corresponding pixel in the temporally preceding digital picture if the difference value is smaller than a fourth threshold, and the pixel is determined not to be similar to the corresponding pixel in the temporally preceding digital picture if the difference value is larger than the fourth threshold. The fourth threshold may be predetermined.

The method 100 may advantageously reduce noise from video sequences effectively while preserving edges and details of the digital picture. The classification of the type of each block which is further associated to a filtering mode may exploit the fact that human perception of noise depends on the underlying contents of surrounding neighborhoods. For example, the noise in homogenous neighborhoods may be more apparent to an observer compared to that in textured neighborhoods. Therefore, by applying different degrees and approaches of filtering to different type of blocks, noise may be reduced effectively from video sequences while edges and details may be preserved as much as possible.

Step 102 of method 100 will now be described in more details in the following. According to method 100, different filtering modes are used to filter the blocks of different types (step 104), and thus the filtering results or performance may be dependent on the determination of the types of the blocks of a digital picture. In various embodiments, various image classification methods may be used to determine a type of each block, e.g. a texture type, an edge type, or a homogenous type. These clustering methods may be based on image statistics, spatial similarity, or image distance. It may be convenient to compromise between a better result of filtering noise and preserving details by applying different filtering modes to different types of blocks.

In the exemplary embodiment, the determination of the type of each block of the digital picture may include detecting texture contrast (the contrast value) of the block. In more detail, for example, each pixel of a block is compared with the mean pixel value of the block, and grouped into smaller-than-mean and bigger-than-mean groups. Then, two new mean values of each group is determined. The contrast of these two groups is then computed. The resulted contrast is then compared with predetermined thresholds so as to determine the type of the block.

In the exemplary embodiment where the contrast values is used as the characteristic value for determining the type of each block of the digital picture, the type of each block may be determined as follows. The contrast value of a block may be compared against predetermined threshold values. If the contrast value of a block is larger than a first threshold, the block may be regarded as an edge block. If the contrast value is between the first threshold value and a second threshold, a block may be regarded as a texture block, wherein the first threshold is larger than the second threshold. If the contrast value is lower than the second threshold value, the block may be regarded as a homogenous block. In an exemplary embodiment, the first threshold value may be substantially larger than the second threshold value. In a further exemplary embodiment, the first threshold value may be 30, and the second threshold value may be 15.

Figure 2:
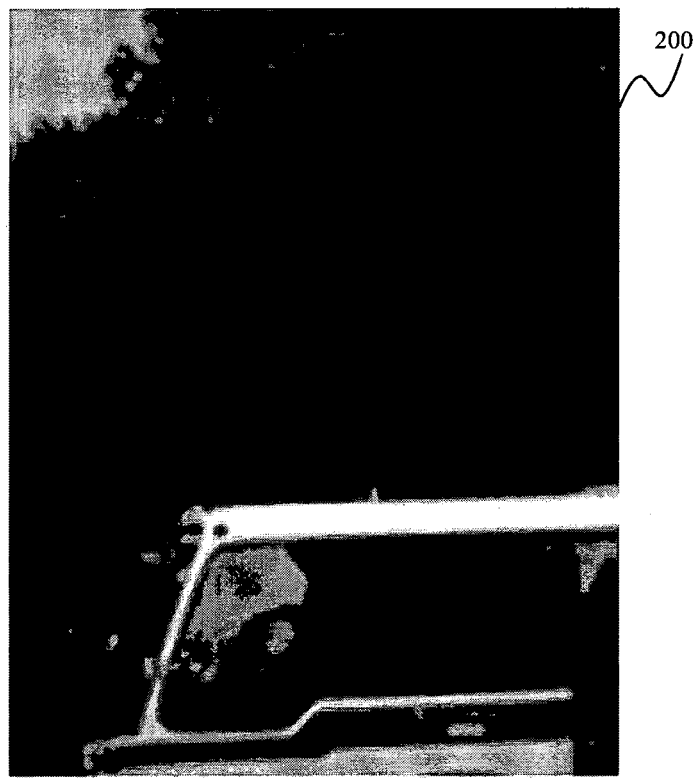
FIG. 2 (a) illustrates a digital picture.
Figure 2:
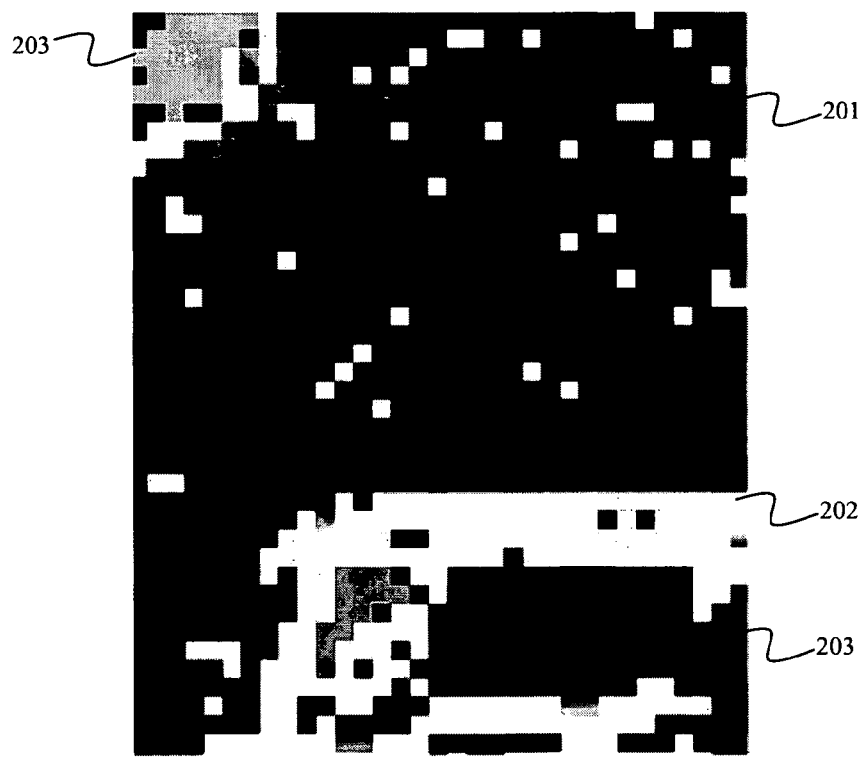

FIG. 2 (a) illustrates a digital picture 200 of 335 by 256 pixels. The digital picture 200 may be divided into a plurality of blocks. In this example, there are 8 by 8 pixels per block. FIG. 2 (b) shows an example of the classification of blocks of the digital picture 200 into the texture type, edge type and homogenous type. In FIG. 2 (b), blocks that are black represent texture blocks (blocks of texture type) 201, blocks that are white indicate edge blocks (blocks of edge type) 202, and the remaining blocks are homogeneous blocks (blocks of homogeneous type) 203.

Filtering modes for different types of blocks are described as follows according to various exemplary embodiments.

Homogenous blocks are generally the most abundant ones in video sequences of digital pictures. For example, many video contents are naturally comprised of homogeneous areas such as blue sky, non-pattern wall etc. Since there is no structure or details in the blocks of homogeneous type, over-smoothing is generally not a concern for a block of homogeneous type. Thus, the most intense level of filtering may be applied to pixels in the homogenous blocks to obtain improved filtering results.

Figure 3:
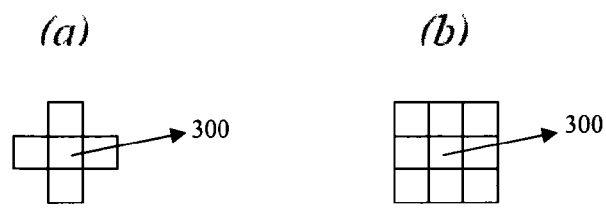
FIG. 3 (a) shows relative positions of pixels that may be used by a spatial filter.

FIGS. 3 (a) and (b) illustrate the relative positions of adjacent pixels of a pixel that may be used by spatial filtering.

FIG. 3 (a) shows a pixel 300, p(x, y), and its four corresponding adjacent neighboring pixels to the north, south, east and west of pixel 300, which is indicated as 4-adjacent neighbors. x and y indicates the spatial coordinates of the pixel 300. The pixel 300 may be spatially filtered by selecting a mean value of pixel 300 and its 4 adjacent neighbor pixels as the new value of pixel 300, for example.

FIG. 3 (b) shows the pixel 300 has eight adjacent pixels, which is indicated as 8-adjacent neighbors. The pixel 300 may be spatially filtered by selecting a mean value of pixel 300 and its 8 adjacent neighbor pixels as the new value of pixel 300. The spatial filtering of pixel 300 shown in FIG. 3 (a) is to a less degree compared with the spatial filtering of pixel 300 shown in FIG. 3 (b).

Figure 4:
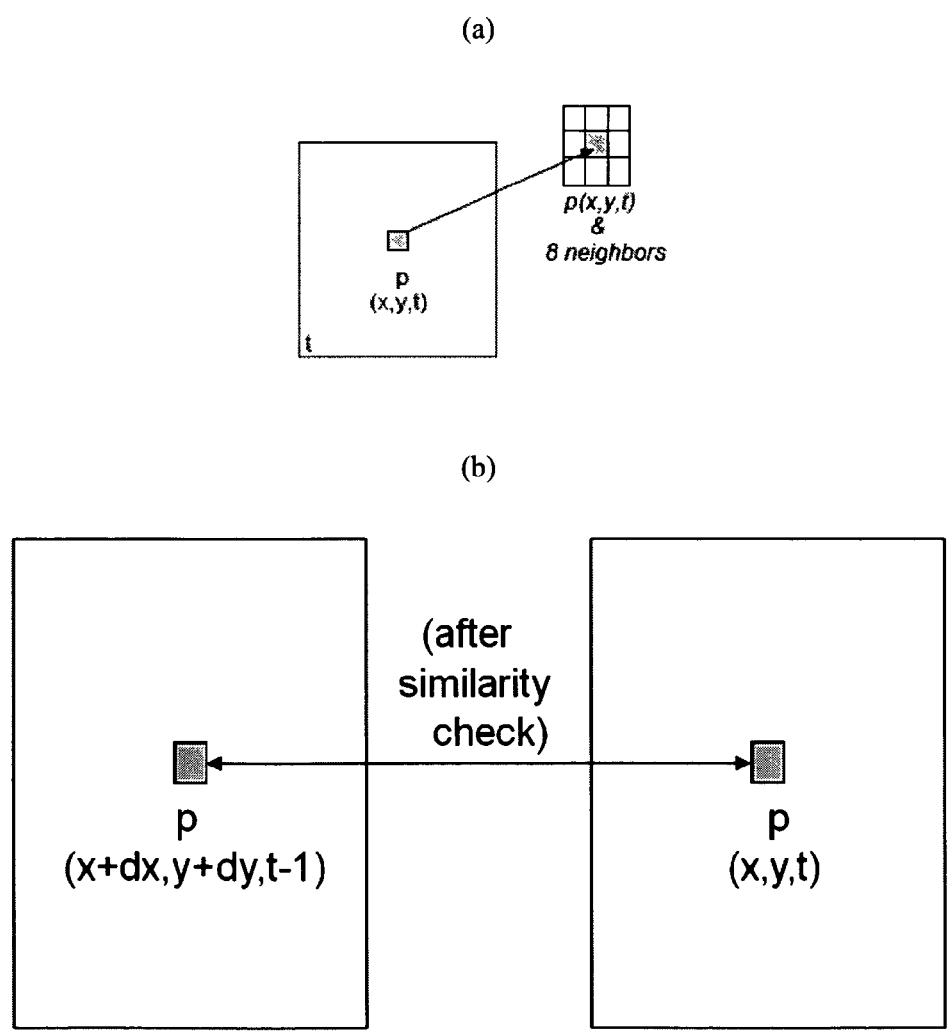
FIG. 4 (a) illustrates that spatial filtering is performed for each pixel of a block of homogeneous type in one embodiment.

FIGS. 4 (a) and (b) illustrate the filtering mode for a block of homogeneous type according to one exemplary embodiment. Each block may be spatially averaged with its 8-adjacent neighbors as shown in FIG. 4 (a), and then motion compensated temporal filtered. FIG. 4 (b) shows that a similarity check between each pixel of the homogeneous block and the corresponding pixel in the temporally preceding digital picture may be applied prior to the motion compensated temporal filtering.

In one exemplary embodiment, as shown in FIG. 4 (a), a pixel of a homogenous block may be averaged spatially with its 8-adjacent neighbors as shown in equation (1).

$$p(x, y, t)_{filtered\_s} = \left[\sum_{i=-1}^{1}\sum_{j=-1}^{1} p(x-i, y-j, t)_{noisy}\right]/9 \quad (1)$$

where, $p(x,y,t)_{filtered\_s}$ is a spatial filtered pixel, and t represents the index of digital picture, i.e. temporal coordinate; $p(x-i, y-j, t)_{noisy}$ is the unfiltered pixel.

To further remove conceivable temporal noise that may still exist in spatially filtered homogenous parts, motion-compensated temporal filtering may be further applied to those pixels of a homogeneous block. The motion compensated temporal filtering may be carried out according to equation (2). In other words, in one exemplary embodiment, a pixel of a homogenous block may be spatially averaged and then motion compensated temporally averaged.

$$p(x,y,t)_{filtered} = [p(x,y,t)_{filtered\_s} + p(x+\nabla x, y+\nabla y, t-1)_{filtered}]/2 \quad (2)$$

where $p(x+\nabla x, y+\nabla y, t-1)_{filtered}$ (which corresponds to p(x+dx, y+dy, t−1) in FIG. 4 (b)) is the pixel value of the pixel in the temporally preceding filtered digital picture t−1 that represents the same object as of the pixel p(x, y) in the current digital picture t does.

FIG. 4 (b) illustrates that before applying the motion compensated temporal filter, a similarity check may be performed for each pixel and its corresponding pixel in the temporally preceding digital picture so as to determine whether the two pixels are similar enough according to a predetermined criterion. p(x,y,t) in FIG. 4 (b) corresponds to the $p(x,y,t)_{filtered}$ in equation (2). p(x+dx, y+dy, t−1) in FIG. 4 (b) corresponds to $p(x+\nabla x, y+\nabla y, t-1)_{filtered}$ in equation (2). The temporal filtering may be performed only if it is determined that the pixel is similar with its corresponding pixel in the temporally preceding digital picture. The similarity check will be described in detail later.

Figure 5:
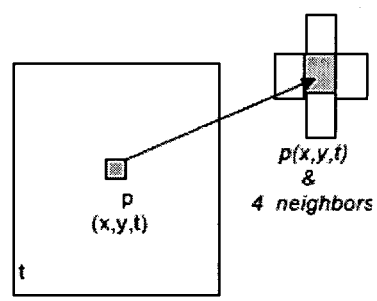
FIG. 5 (a) illustrates that spatial filtering is performed for each pixel of a block of texture type in one embodiment.
Figure 5:
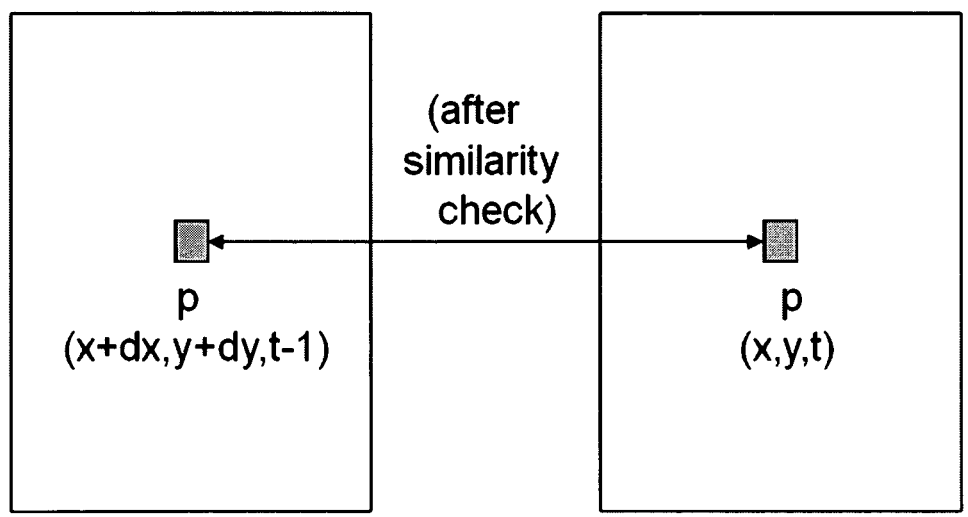

FIGS. 5 (a) and (b) illustrate the filtering mode for a block of texture type according to one exemplary embodiment. Each block may be spatially averaged with its 4-adjacent neighbors as shown in FIG. 5 (a), and motion compensated temporal averaged.

The intensity levels of pixel values of a texture block may vary in a moderate margin, or in other words, not as large as in a edge block, especially in weak textures such as pixels in scenes of flames, smoke or running waters. The variations of intensity level in the texture block behave noise-like, and the patterns of the variation of intensity level are relatively noticeable. The noise on these situations is generally more tolerable than that on homogenous ones. In addition, it may be difficult to distinguish from noisy homogenous parts when noise level is high.

Therefore, the texture blocks are less spatially filtered compared with homogeneous blocks in order to preserve details while reducing according to one embodiment. Accordingly, a compromise between noise filtering and detail preserving may be achieved by the texture block filtering. In one exemplary embodiment, a pixel in a current digital picture is multiplied by four (w1=4) and averaged with its 4-adjacent neighbors spatially (w2=1, w3=1, w4=1 and w5=1) as in equation (3), $$p(x, y, t)_{filtered\_s} = [w1 * p(x, y, t)_{noisy} + w2 * p(x-1, y, t)_{noisy} + \quad (3)$$
$$w3 * p(x+1, y, t)_{noisy} + w4 * p(x, y-1, t)_{noisy} +$$
$$w5 * p(x, y+1, t)_{noisy}]/(w1 + w2 + w3 + w4 + w5)$$

where $p(x, y, t)_{noisy}$ is the noisy pixel to be filtered and $p(x, y, t)_{filtered\_s}$ is the spatially filtered pixel. The symbols x and y indicates spatial coordinates, and t indicates the temporal coordinate.

From computational complexity point of view, the multiply-by-four (i.e. w1=4) and divide-by-eight (i.e. sum of w1 to w5) operations as shown in equation (3) are cheaper to implement compared with the setting of w1=w2=w3=w4=w5=1. To reduce the temporal noise further, a motion compensated temporal filtering may be applied. FIG. 5 (b) shows that similarity check as mentioned above may be applied before the temporal averaging. If a pixel is regarded as similar with its corresponding pixel in the temporally preceding digital picture, motion compensated temporal averaging may be applied to a pixel of a texture block of a current digital picture with the pixel from the adjacent previous digital picture that represents the same object as the current pixel does as shown in equation (4), where $\nabla x$ and $\nabla y$ are motion vector variables.

$$p(x,y,t)_{filtered} = [p(x,y,t)_{filtered\_s} + p(x+\nabla x, y+\nabla y, t-1)_{filtered}]/2 \quad (4)$$

Otherwise, the pixel may be bypassed.

In edge blocks, over-smoothing caused by averaging is generally least tolerable. The effect of smoothing may be apparent if it occurred. Thus, spatial averaging which may cause obvious smoothing is not applied to edge blocks in one exemplary embodiment, and only temporal averaging is used for edge blocks. To avoid trailing artifacts common to temporal averaging, motion compensation may be applied. To reduce the computation complexity, the motion information used may be the estimation from that of previous, adjacent (temporally preceding) digital picture, computed during the encoding process of the previous picture. A similarity check as described above may be applied before filtering to counter the inconsistencies in motion information. If it is determined to be similar, motion-compensated temporal averaging may be applied to a pixel of an edge block of a current digital picture with the pixel from the adjacent previous digital picture that represents the same object as the pixel in the current digital picture does as shown in equation (5) where $\nabla x$ and $\nabla y$ are motion vector variables.

$$p(x,y,t)_{filtered} = [p(x,y,t)_{noisy} + p(x+\nabla x, y+\nabla y, t-1)_{filtered}]/2 \quad (5)$$

Otherwise, the pixel may be bypassed.

Figure 6:
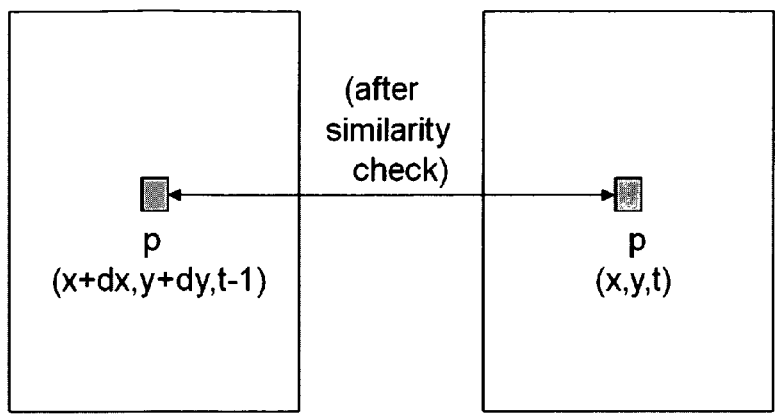
FIG. 6 illustrates a similarity check is performed for each pixel of the block of edge type before motion compensated temporal filtering is applied in one embodiment.

FIG. 6 illustrates, according to one exemplary embodiment, a similarity check is carried out for each pixel of the edge block with its corresponding pixel from adjacent previous frame before motion compensated temporal filtering is applied. $p(x,y,t)$ in FIG. 6 corresponds to $p(x,y,t)_{noisy}$ in equation (5), and $p(x+dx, y+dy, t-1)$ corresponds to $p(x+\nabla x, y+\nabla y, t-1)_{filtered}$ in equation (5).

The similarity check will now be described in more detail as follows.

Figure 7:
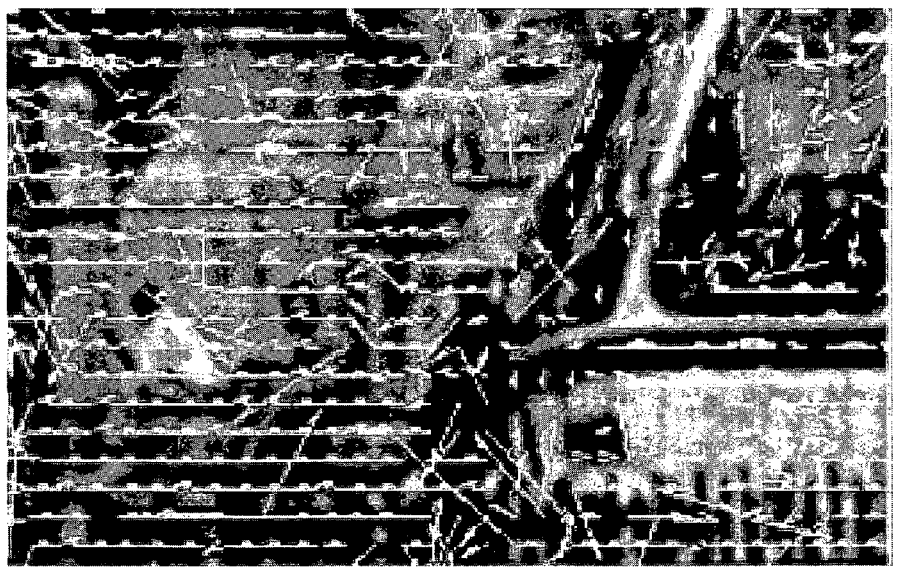
FIGS. 7 (a)-(d) illustrate a series of digital pictures of a video sequence with motion vectors indicated on each digital picture.
Figure 7:
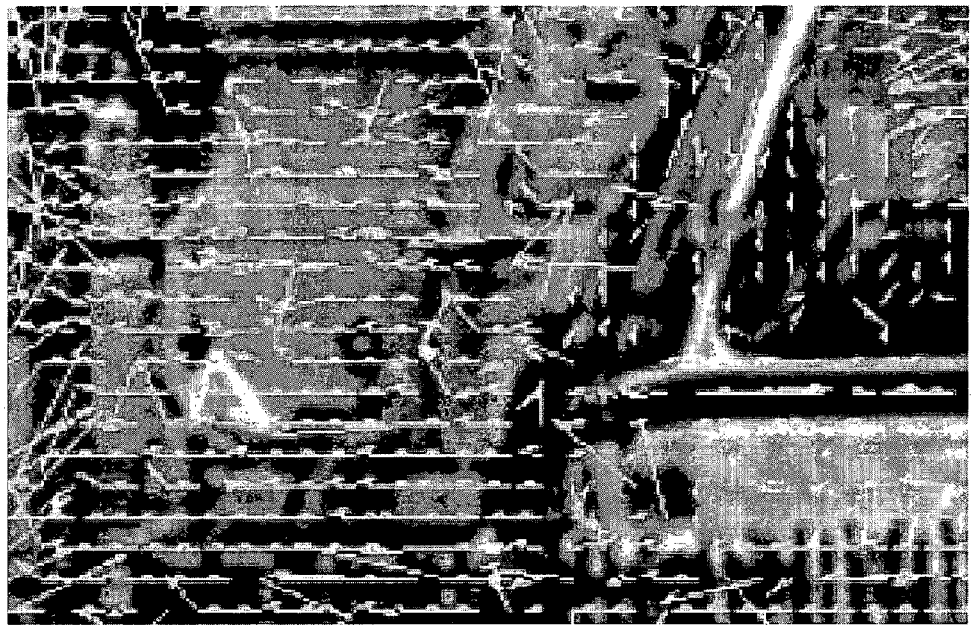
Figure 7:
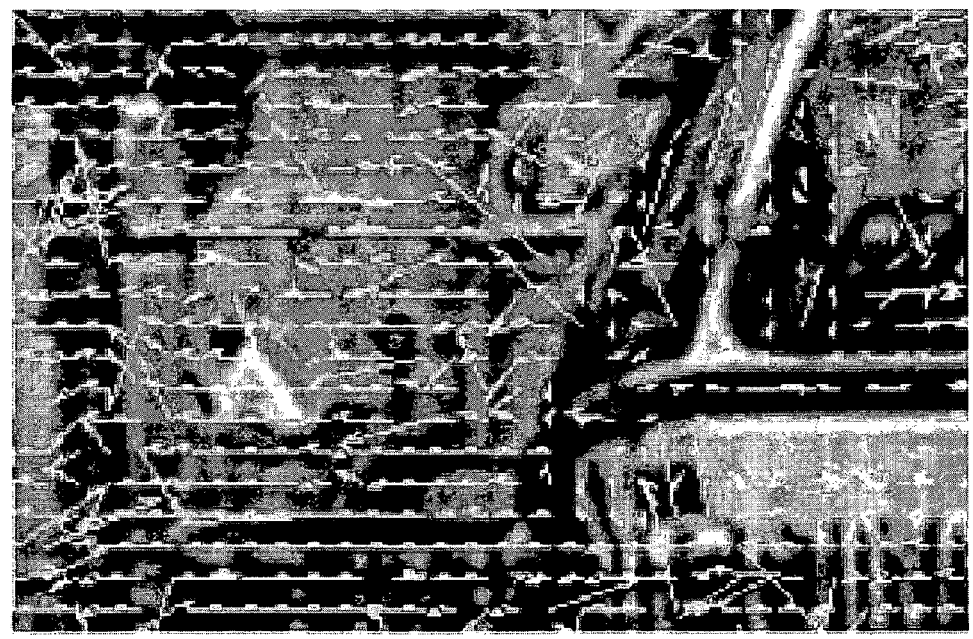
Figure 7:
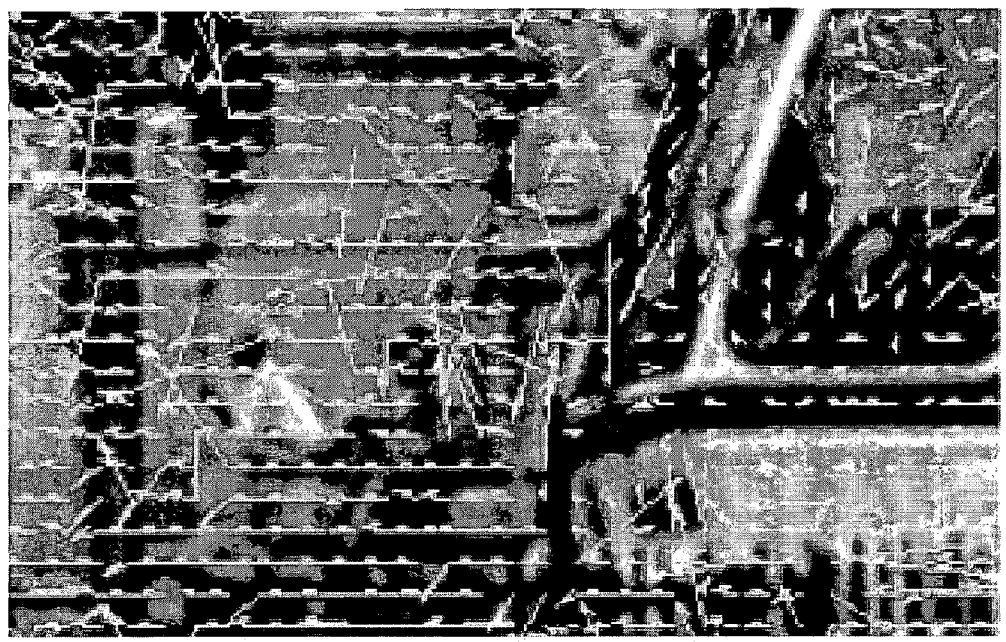

FIGS. 7 (a)-(d) show four successive digital pictures in a video sequence, respectively. The arrows indicated in each figure of FIG. 7 (a)-(d) are motion vectors. The motion vectors may provide motion information which may be used in motion compensated temporal filtering. As can be seen from FIG. 7 (a)-(d), it is noted that while most motion vectors are very similar in successive digital pictures in a video sequence, there can be inconsistencies in motion information produced by most methods in noisy conditions. Erroneous motion information can cause serious artifacts. In case of scene changes and abrupt movements, these serious artifacts may occur upon the application of motion compensated temporal filtering. To avoid such a problem, according to one embodiment, motion compensated temporal filtering to each block of pixels in the block is carried out only for pixels that are determined to be similar with the corresponding pixels in the temporally preceding digital picture according to a first similarity criterion. In other words, in one embodiment, it is first determined whether each pixel of a block to be filtered is similar to the corresponding pixel in the temporally preceding digital picture according to the first criterion, and the motion compensated temporal filtering is only carried out to the pixel if it is determined that the pixel is similar to the corresponding pixel according to the first similarity criterion. Otherwise, the motion compensated temporal filtering is not carried out for the pixel. In one embodiment, determination for each pixel of the block of whether the pixel is similar to the corresponding pixel in the temporally preceding digital picture may be based on a similarity check for the pixel with reference to the corresponding pixel in the temporally preceding digital picture.

In one embodiment, the similarity check may include producing a motion map of the digital picture by differencing pixels of the digital picture with corresponding pixels from the temporally preceding digital picture. The motion map may have a plurality of motion map values, each motion map value being associated to a pixel of the digital picture. Each motion map value may be set to be a first number, e.g. 1, if the associated pixel is determined to be similar to the corresponding pixel in the temporally preceding digital picture according to a second similarity criterion, and each map value may be set to be a second number, e.g. 0, if the associated pixel is determined to not be similar with the corresponding pixel in the temporally preceding digital picture according to the second similarity criterion. The similarity check may further include determining, for each pixel, whether the pixel is similar with the corresponding pixel in the temporally preceding digital picture according to the first similarity criterion which is based on the motion map value associated with the pixel and motion map values associated with pixels adjacent to the pixel.

In one exemplary embodiment, according to the first similarity criterion, for each pixel, a sum of the motion map value associated with the pixel and motion map values associated with pixels adjacent to the pixel is compared with a third threshold. The pixel may be determined to be similar to the corresponding pixel in the temporally preceding digital picture if the sum is larger than the third threshold, and the pixel may be determined not to be similar to the corresponding pixel in the temporally preceding digital picture if the sum is smaller than the third threshold. The third threshold may be predetermined.

In one embodiment, according to the second similarity criterion, for each pixel, a difference value between the pixel and the corresponding pixel in the temporally preceding digital picture is determined. The pixel may be determined to be similar to the corresponding pixel in the temporally preceding digital picture if the difference value is smaller than a fourth threshold, and the pixel may be determined not to be similar to the corresponding pixel in the temporally preceding digital picture if the difference value is larger than the fourth threshold. The fourth threshold may be predetermined.

For example, to be able to do similarity check, the motion map, mm, of the current video frame (digital picture) is produced at the start of the filtering process by differencing every pixel of the current digital picture with its corresponding pixel from the adjacent previous digital picture. If the difference value is smaller than a predefined motion threshold, th_motion (the fourth threshold), the pixel may be determined as sufficiently similar, and its motion map value for this pixel, mm[x, y], may be set to 1. Otherwise, it may be set to 0. In one exemplary embodiment, th_motion may be set to be 8.

After producing the motion map, to determine whether a pixel p(x, y) is similar with the corresponding pixel in the temporally preceding digital picture according to the first similarity criterion, a sum of the motion map values corresponding to the pixel p(x,y) and its 8-adjacent neighbors may be counted. According to the first similarity criterion, for example, if the count is more than or equal to 7 (an example of the third threshold), pixel p(x,y) may be regarded as similar to the corresponding pixel in the temporally preceding digital picture. The pixel p(x,y) is further motion compensated temporally filtered only if it is determined to be similar with the corresponding pixel in the temporally preceding digital picture according to the first similarity criterion. Otherwise, pixel p(x,y) is left unfiltered to avoid artifacts which may cause more degradation to the video visual quality.

Figure 8:
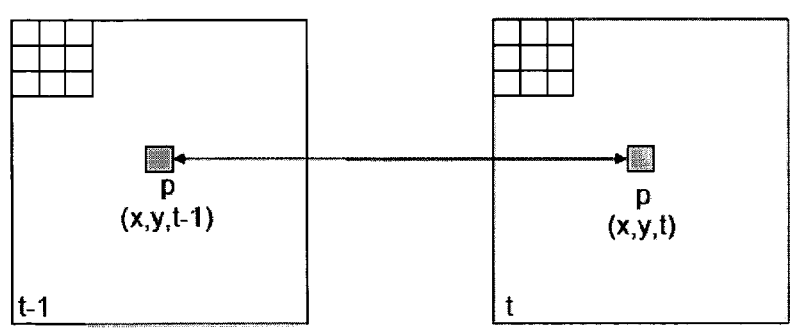
FIG. 8 (a) illustrates that for similarity check, a motion map value of a motion map is generated by comparing the pixel value of a pixel of the current digital picture with the pixel value of the corresponding pixel in the temporally preceding digital picture in one embodiment.
Figure 8:
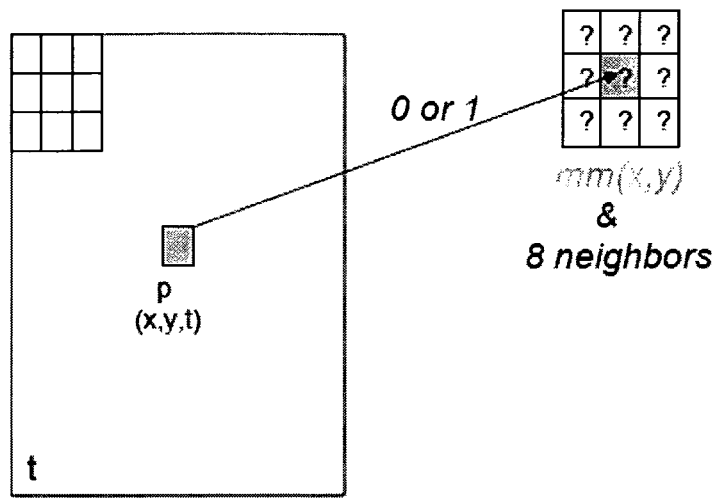

FIGS. 8 (a) and (b) further illustrate, according to one exemplary embodiment, the similarity check which is applied prior to all temporal averaging to avoid effects of inconsistencies from motion information involved. FIG. 8 (a) illustrates the determination of each motion map value mm[x,y] of the motion map mm, which may be based on the following computational steps. For the motion map value mm[x,y] for frame t, if |p(x,y,t)−p(x,y,t−1)|≤th_motion, mm[x,y]=1 else mm[x,y]=0.

FIG. 8 (b) further illustrates a further step of the similarity check of comparing the sum of the motion map values corresponding to pixel p(x,y) and its adjacent pixels with a predetermined threshold value. If the sum is larger than the third threshold, the temporal filtering is then carried out.

Figure 9:
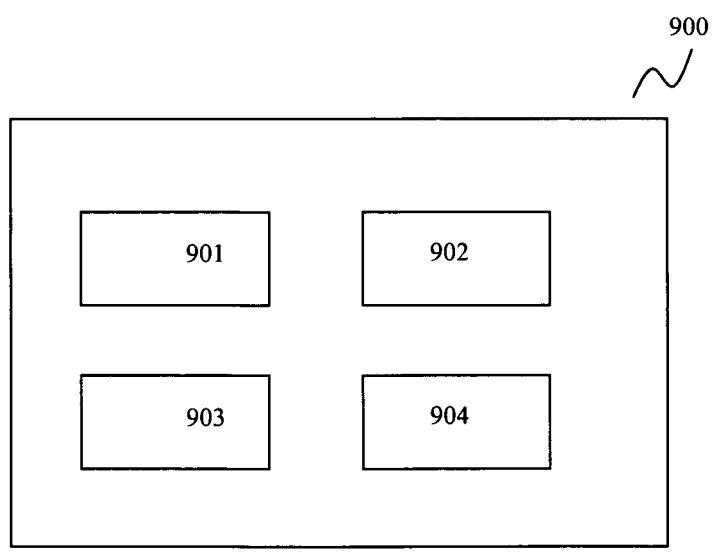
FIG. 9 illustrates a device for processing a digital picture in one embodiment.

FIG. 9 illustrates a device 900 for processing a digital picture which corresponds to the method 100. The digital picture comprises a plurality of pixels. The device 900 includes a dividing unit 901 for dividing the digital picture into a plurality of blocks, each block comprising a plurality of pixels. The device 900 further includes a determining unit 902 for determining a type of block for each block. The device 900 further includes an associating unit 903 for associating each block with a filtering mode of a plurality of different filtering modes according to the type determined for the block. The device 900 further includes a filtering unit 904 for filtering each block using the associated filtering mode associated with the block.

In one embodiment, a computer readable medium is provided. The computer readable medium has a program recorded thereon, wherein the program is executed to make a computer process a digital picture. The digital picture comprises a plurality of pixels. The computer readable medium may include instructions for dividing the digital picture into a plurality of blocks, each block comprising a plurality of pixels. The computer readable medium may further include instructions for determining a type of block for each block.

The computer readable medium may further include instructions for associating each block with a filtering mode of a plurality of different filtering modes according to the type determined for the block. The computer readable medium may further include instructions for filtering each block using the associated filtering mode associated with the block.

Figure 10:
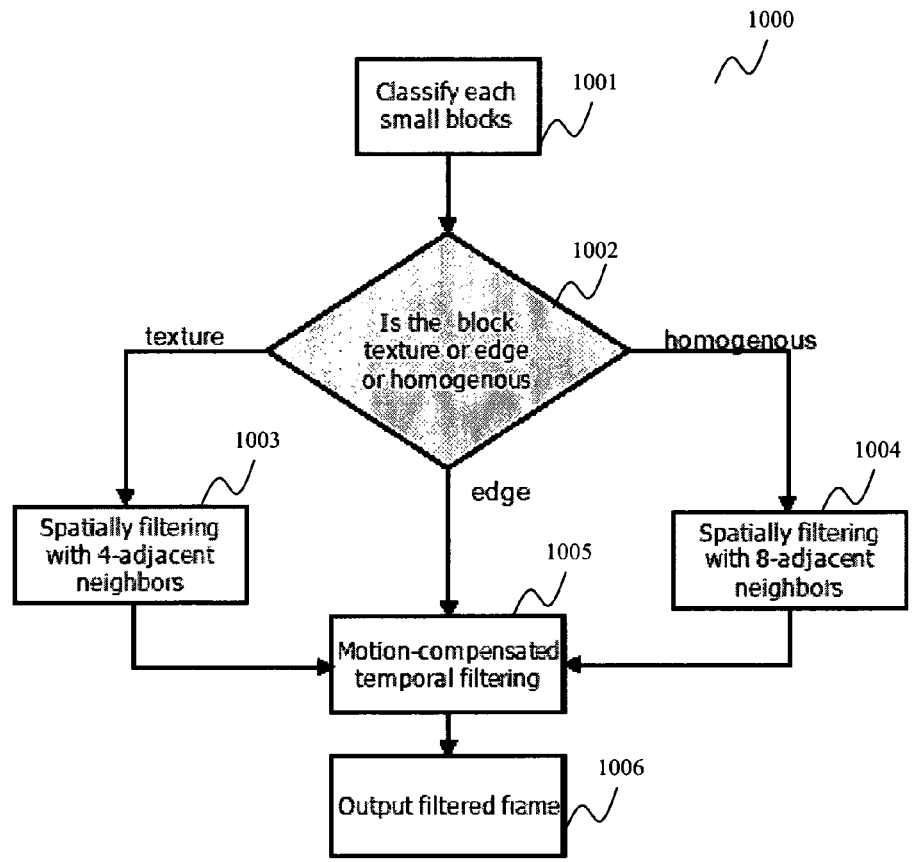
FIG. 10 illustrates a method for processing a digital picture according to one exemplary embodiment.

FIG. 10 illustrates a method 1000 for processing a digital picture in an exemplary embodiment. The digital picture may comprise a plurality of pictures and be divided into a plurality of blocks, each block comprising a plurality of pixels. For example, each block may have a predetermined number of pixels, and each block may be a square block. The size of each block is preferably small such as 8 by 8 or 16 by 16. The method 1000 includes 1001 classifying each block of the digital picture. In an exemplary embodiment, each block is determined to be a texture type of block, an edge type of block or a homogenous type of block according to a characteristic value of each block. The method 1000 further includes 1002 associating each block with a filtering mode according to the type of the block. That is, if a block is of a texture type, the block is associated with a texture filtering mode; if a block is edge type of block, the block is associates with an edge filtering mode; and if a block is of a homogeneous filtering type, the block is associated with a homogeneous filtering mode. For a block of a texture type, a spatial filtering is applied in 1003 followed by a motion-compensated temporal filtering in 1005. For a block of a homogeneous type, a spatial filtering is applied in 1004 followed by a motion-compensated temporal filter in 1005. If a block is of edge type, a motion-compensated temporal filter is applied in 1005. After all the blocks of the digital picture are filtered according to their respective type and associated filtering modes, a filtered digital picture is output in step 1006. It is noted that before the motion compensated temporal filtering is applied, a similarity check may be carried out, and the motion compensated temporal filtering may only be applied if the pixel is determined to be similar with the corresponding pixel of the temporally preceding digital picture.

In other words, according to the method 1000, the blocks of a digital picture classified into texture, edge or homogenous according to their contents. Then, different filtering is applied to the pixels of each block according to their respective types or classifications. In one embodiment, pixels in homogenous blocks or texture blocks may be first spatially averaged, followed by motion-compensated temporal filtering to obtain better noise reduction results. In a further embodiment, pixels in texture blocks are less filtered spatially to preserve the details compared with that in homogeneous blocks. In one embodiment, no spatial filtering is applied to edge blocks, and pixels in edge blocks are motion-compensated temporally averaged with its adjacent previous frame to avoid oversmoothing. The filtered output digital picture may be directed to but not limited to, an advanced video coding reference encoder. In one embodiment, the motion information yielded in the encoding process may be used in filtering process of the next digital picture. In one embodiment, motion information of the previous digital picture that is readily available from the encoding process which is carried out after the filtering process may be used in motion compensation process of filtering the current frame. Hence, computationally intensive motion information finding process can be avoided, and complexity of the overall algorithm can be hugely reduced.

Most filtering methods that use motion compensation usually find motion information separately before filtering process. This is computationally expensive and time consuming. In a typical video encoder, motion information of a digital picture is available from encoding process. It is known that motions in adjacent digital pictures of a video sequence are usually similar except in some scene changes and abrupt movement cases. Thus, motion information available from encoding process of the adjacent, previous (temporally preceding) digital picture may be used in motion compensation process of filtering of the current digital picture according to one embodiment.

Figure 11:
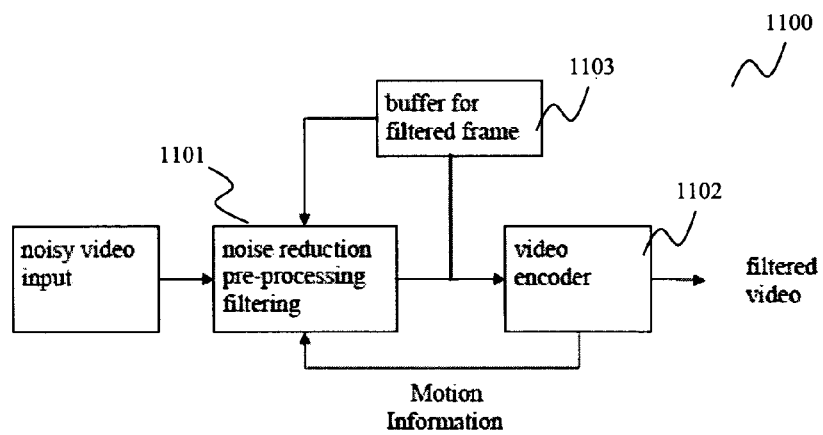
FIG. 11 illustrates a system for processing a video sequence of digital pictures according to one embodiment.

FIG. 11 illustrates a system 1100 for video noise reduction according to one embodiment.

The system 1100 may include a filtering unit 1101 and a video encoder 1102.

For example, a video sequence of digital pictures with noise may be input into the filtering unit 1101 in a sequential manner. The filtering unit 1101 may be the same as the device 900 as described with reference to FIG. 9, and the filtering unit 1101 may process digital pictures of the video sequence in a sequential manner to reduce the noise in the digital pictures.

The output of the filtering unit 1101 may be fed into the video encoder 1102 for encoding the filtered video sequence in a sequential manner. The motion information of a digital picture may be available during the encoding process by the video encoder 1102.

In one embodiment, motion information may be obtained by the video encoder 1102 based on a motion estimation between a first digital picture and a second digital picture of the filtered video sequence of digital pictures. The filtering unit 1101 may perform the motion compensated filtering of a third digital picture based on the motion information from the video encoder 1102.

The system 1100 may further include a buffer 1103. For example, the output of the filtering unit 1101 may be fed to both the video encoder 1102 for encoding the filtered digital picture and the buffer 1103. The buffer 1103 may store a filtered digital picture and may provide the filtered digital picture to the filtering unit 1101 when the filtering unit 1101 processes the next digital picture. For example, when the filtering unit 1101 performs a similarity check for a digital picture, the buffer 1103 may provide the filtering unit 1101 with a temporally preceding filtered digital picture such that the filtering unit 1101 can perform the similarity check for the currently processed digital picture with reference to the previously processed digital picture.

Figure 12:
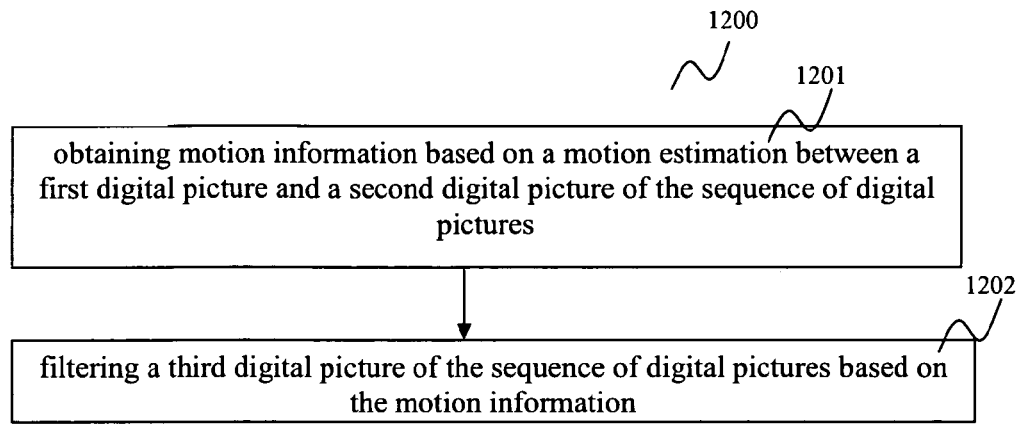
FIG. 12 illustrates a method for processing a sequence of digital pictures in one embodiment.

FIG. 12 shows a method 1200 for processing a sequence of digital pictures in one embodiment. The method 1200 includes 1201 obtaining motion information based on a motion estimation between a first digital picture and a second digital picture of the sequence of digital pictures. The method 1200 further includes 1202 filtering a third digital picture of the sequence of digital pictures based on the motion information.

In one embodiment, the first digital picture and the second digital picture are digital pictures preceding the third digital picture in the sequence of digital pictures.

In one embodiment, the filtering is motion compensated temporal filtering.

In one embodiment, the method 1200 further includes encoding the third digital picture.

In one embodiment, the method 1200 further includes encoding the first digital picture and the second digital picture, and obtaining the motion information from the encoding process of the first digital picture and the second digital picture.

In one embodiment, in other words, a video sequence of digital pictures may be processed, and each digital picture may be filtered to reduce noise in the digital picture. Motion information may be needed to be used in the filtering process.

However, it may be computationally expensive and time consuming to obtain the motion information of each digital picture before the filtering process. On the other hand, it is known that motions in adjacent digital pictures of a video sequence are usually similar except in some scene changes and abrupt movement cases. Thus, in one embodiment, motion information of adjacent digital picture or pictures, e.g. temporally preceding digital pictures, may be used to process a current digital picture. For example, such motion information may be available from encoding process of the temporally preceding digital picture or pictures (adjacent, previous digital picture or pictures) which is carried out after the filtering process. The motion information may be obtained based on a motion estimation of a first temporally preceding digital picture and a second temporally preceding digital picture, and such motion information may be may be used to process, e.g. to filter, the current digital picture (a third digital picture).

Using motion information of previous digital picture of a video sequence can greatly lower the computational complexity of the overall filtering algorithm.

Figure 13:
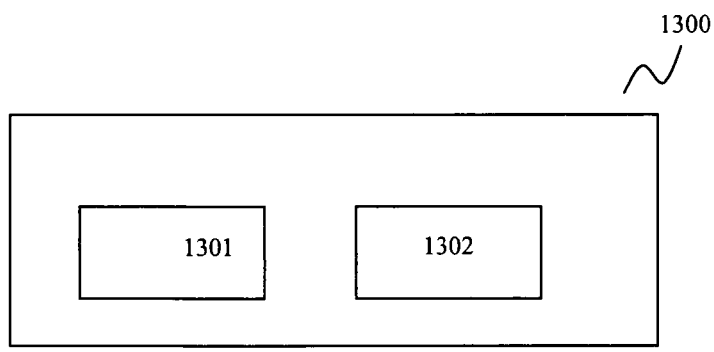
FIG. 13 illustrates a device for processing a sequence of digital pictures in one embodiment.

FIG. 13 shows a device 1300 for processing a sequence of digital pictures in one embodiment which corresponds to the method 1200. The device 1300 may include an obtaining unit 1301 for obtaining motion information based on a motion estimation between a first digital picture and a second digital picture of the sequence of digital pictures. The device 1300 may further include a filtering unit 1302 for filtering a third digital picture of the sequence of digital pictures based on the motion information.

In one embodiment, a computer readable medium which corresponds to the method 1200 is provided. The computer readable medium may have a program recorded thereon, wherein the program is executed to make a computer process a sequence of digital pictures. The computer readable medium may include instructions for obtaining motion information based on a motion estimation between a first digital picture and a second digital picture of the sequence of digital pictures. The computer readable medium may further include instructions for filtering a third digital picture of the sequence of digital pictures based on the motion information.

Figure 14:
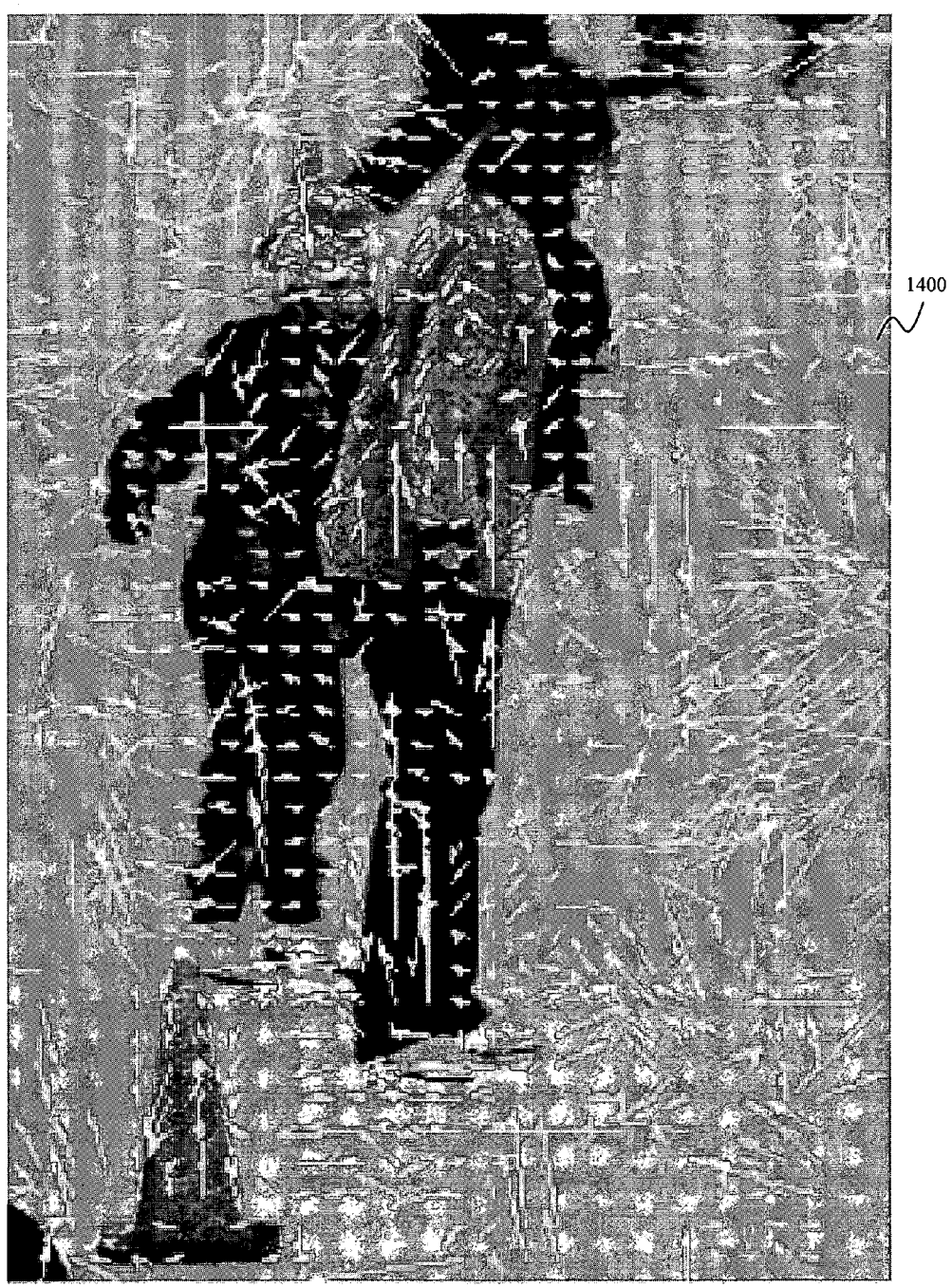
FIGS. 14 (a) and (b) show the motion vectors on a noisy digital picture and the corresponding filtered digital picture, respectively.
Figure 14:
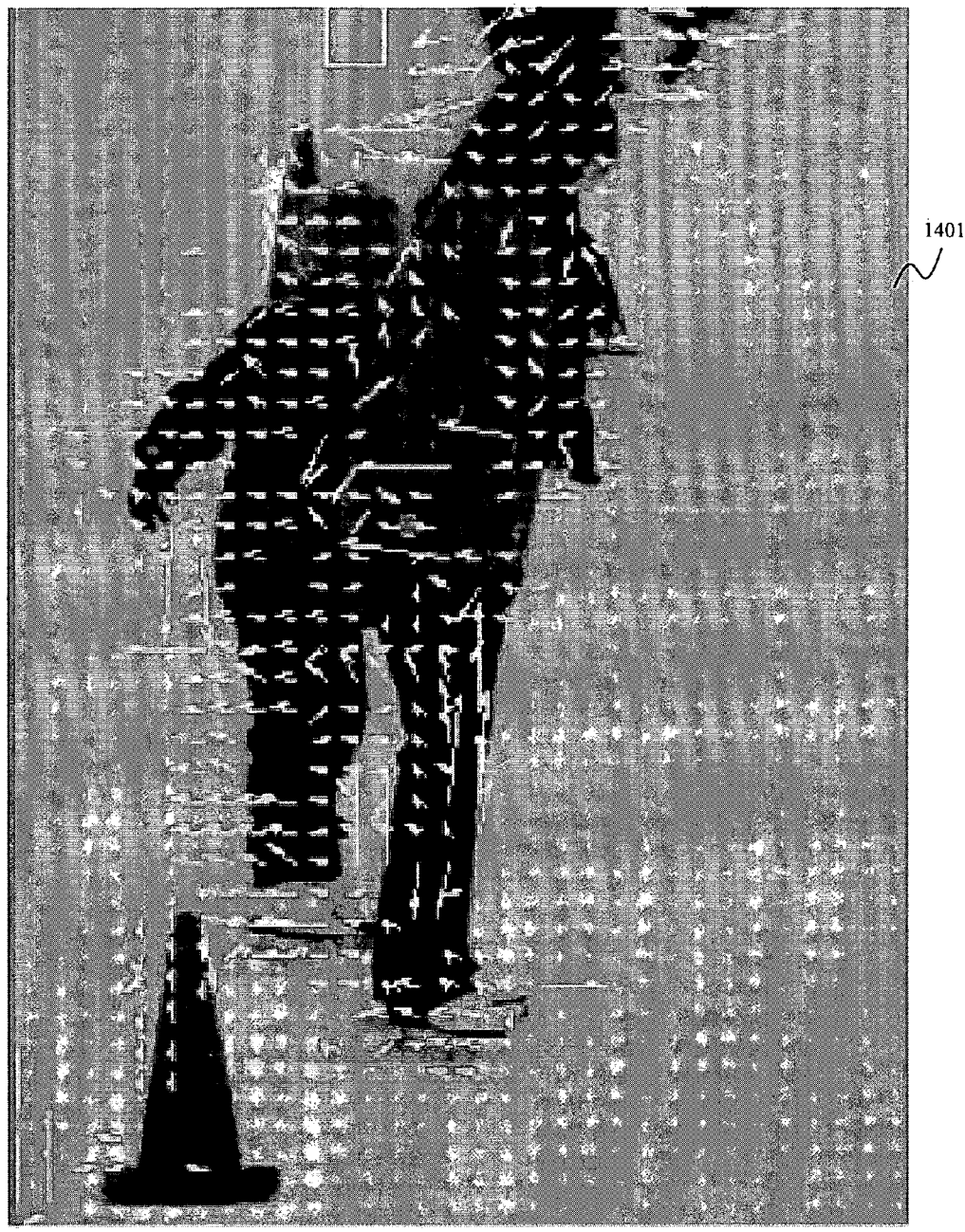

FIGS. 14 (a) and (b) show the motion vectors of the noisy digital picture 1400 and a corresponding filtered digital picture 1401 when encoding using the JM reference encoder. The digital picture 1400 has been processed by the method 100 as described herein to render the filtered digital picture 1401. Arrows in the digital pictures 1400 and 1401 represent the motion vectors. It can be seen that the filtered digital picture 1401 can generate more accurate motion vectors especially at the supposedly homogeneous area which is non-moving region.

FIG. 15(a) shows a noisy digital picture 1500, and FIG. 15(b) shows the corresponding filtered digital picture 1501. It can be seen that the picture quality is significantly improved through the filtering process as described herein.

FIGS. 16(a) and (b) illustrate another example that picture quality is significantly improved, where the test sequences of digital picture with a noisy digital picture 1600, is compared with the filtered one 1601 to illustrate the performance of the proposed noise reduction approach.

Figure 15:
FIG. 15 (a) shows a noisy digital picture.
Figure 15:
Figure 16:
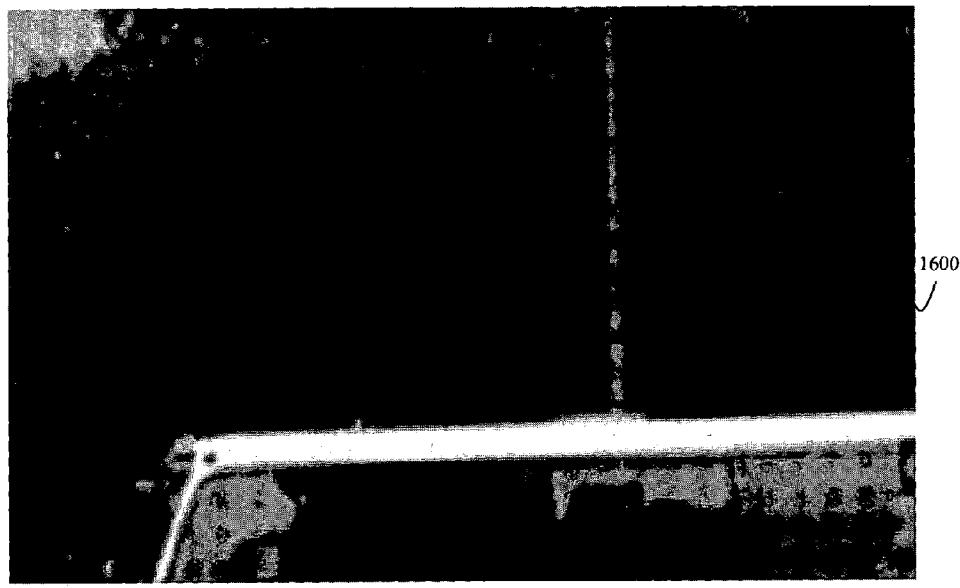
FIG. 16 (a) shows a noisy digital picture.
Figure 16:
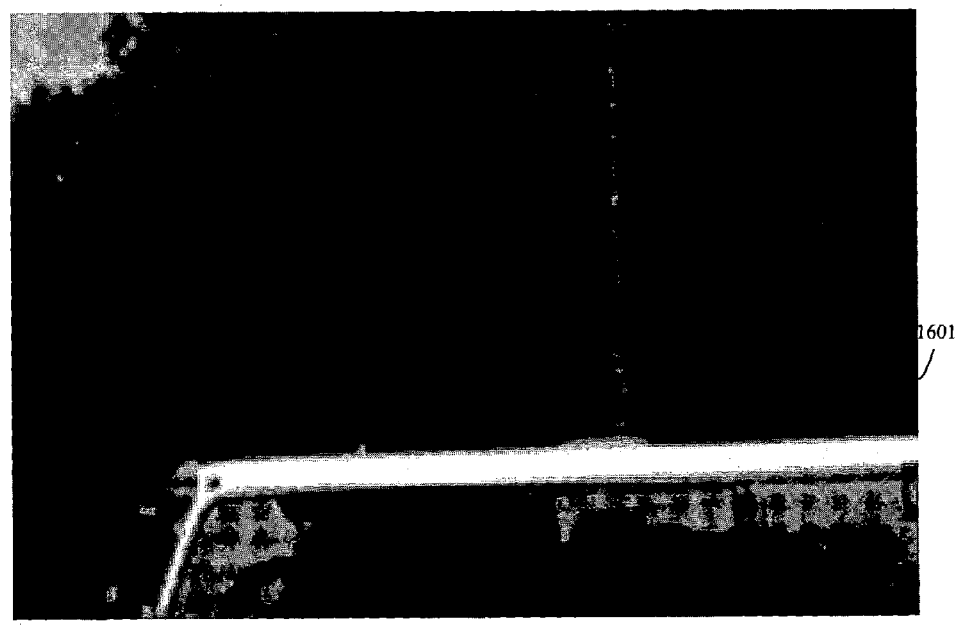

In the examples shown in FIGS. 15 and 16, the visual quality of each noisy digital figure is significantly improved. The noise from homogenous parts, e.g. the ice-skating surface in FIG. 15(a) and window panes of bus and the sky in FIG. 16(a), is reduced noticeably in FIG. 15(b) and FIG. 16(b), respectively. The edges in both cases are well preserved avoiding blurring. As mentioned, noise filtering and details preserving is compromised in texture parts to preserve the details which can be seen in the tree patches of FIGS. 16(a) and (b). Over-smoothing of details from tree textures is avoided. Hence, the sharpness of video is well preserved.

Other than the improvement on visual quality, the various embodiments also improves coding efficiency of the video encoders. It is noted that filtered sequences have significantly smaller file sizes, suggesting that the filtering algorithm improves coding efficiency of the video encoder. The bit-rate reduction (BRR) between noisy and filtered digital pictures can be better seen in percentage calculated as follows $$BRR = \frac{(R_{noisy} - R_{filtered}) \times 100}{R_{noisy}}\%$$

where $R_{noisy}$ and $R_{filtered}$ are bit-rates of encoded noisy and filtered video sequences.

The BRR indicates the coded file size reduction of filtered sequence against its coded noisy one. The improvement of coding efficiency contributed by filtering may be reduced as QP value is increased and the filtering effect is saturated in increased quantization. QP in this context refers to the quantization parameter that is used during the quantization process in the H.264 encoder.

FIG. 17 illustrates a table of the noise reduction approached encoded with a H.264 reference encoder. The bit-rate of five noisy test sequences of digital pictures and the respective bit-rate reduction (BRR) are shown. For the five noisy test sequences of ice-skating, akiyo, mobile, bus, and foreman, the test sequences of ice-skating and akiyo have more homogeneous areas compared with other sequences of mobile, bus, and foreman. In the example, noise is filtered out most intensively in homogenous parts; the performance is significantly evident in the sequences with more homogenous parts, such as the 'ice-skating' and 'akiyo' test sequences, which is shown to yield 87% to 94% BRR. In sequences with substantially more details, e.g. sequences of mobile and bus, filtering is compromised by preserving them.

In summary, various embodiments provide an adaptive method of fast video noise reduction by using block classification and content-sensitive filtering process. The adaptive method includes a fast block classification decision method for a noisy video digital picture. The adaptive method further includes content-sensitive filtering decisions for each block based on the type or classification of the block. The adaptive method further includes motion compensated temporal filtering process. Various embodiments further provide a motion compensated temporal filtering process that can be embedded in a video encoder.

In various embodiments, a method of reducing noise in a video scene or sequence is provided. The method comprising classifying blocks or group of pixels in a video or image frame, and motion-compensated temporal filtering of the classified blocks according to the classification of the classified blocks. This advantageously reduces noise from video sequences effectively while preserving edges and details of the video scene of the video frame. In one example of the motion-compensated temporal or spatial-temporal filtering, the filtering reduces noise effectively from video sequences while preserving edges and details as much as possible. The classification introduced to the filtering further exploits the fact that human perception of noise depends on the underlying contents of surrounding neighborhoods, i.e. the noise in homogenous neighborhoods is more obvious compared to that in textured neighborhoods. Therefore, different degree and approach of filtering may be applied to different neighborhoods.

The various embodiments have also contributed to the improvement in coding efficiency of any block motion compensation based video encoder.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a digital picture, the digital picture comprising a plurality of pixels, the method comprising:
  dividing the digital picture into a plurality of blocks, each block comprising a plurality of pixels;
  determining a type of block for each block;
  associating each block with a filtering mode of a plurality of different filtering modes according to the type determined for the block; and
  filtering each block using the associated filtering mode associated with the block,
  wherein the type of a block is determined based on a characteristic value of the block, and
  wherein the block is determined to be of an edge type if the characteristic value of the block is larger than a first threshold;
  the block is determined to be of a texture type if the characteristic value of the block is between the first threshold and a second threshold, the second threshold being smaller than the first threshold; and
  the block is determined to be of a homogeneous type if the characteristic value of the block is smaller than the second threshold.

2. The method according to claim 1, wherein the digital picture is a digital picture of a video sequence of digital pictures.

3. The method according to claim 1, wherein the characteristic value is contrast value of the pixels in each block.

4. The method according to claim 1, wherein
  each block that is determined to be of an edge type is associated with an edge filtering mode;
  each block that is determined to be of a texture type is associated with a texture filtering mode;
  each block that is determined to be of a homogeneous type is associated with a homogeneous filtering mode.

5. The method according to claim 4, wherein filtering the blocks being associated with the texture filtering mode or homogeneous filtering mode comprises:
  applying spatial filtering to the blocks being associated with the texture filtering mode or homogeneous filtering mode.

6. The method according to claim 5, wherein blocks being associated with the texture filtering mode are spatially filtered in a less degree compared with the blocks being associated with the homogeneous filtering mode.

7. The method according to claim 1, wherein filtering each block comprises:
  applying motion compensated temporal filtering to each block.

8. The method according to claim 7, wherein applying motion compensated temporal filtering to each block comprises:
- determining, for each pixel of the block, whether the pixel is similar to a corresponding pixel in a temporally preceding digital picture according to a first similarity criterion; and
- applying motion compensated temporal filtering to the block for the pixels in the block which are determined to be similar with the corresponding pixels in the temporally preceding digital picture according to the first similarity criterion.

9. The method according to claim 8, wherein the determination for each pixel of the block of whether the pixel is similar to the corresponding pixel in the temporally preceding digital picture is based on a similarity check for the pixel with reference to the corresponding pixel in the temporally preceding digital picture.

10. The method according to claim 9, wherein the similarity check comprises:
- producing a motion map of the digital picture by differencing pixels of the digital picture with corresponding pixels from the temporally preceding digital picture;
- wherein the motion map has a plurality of motion map values, each motion map value being associated to a pixel of the digital picture; wherein each motion map value is set to be a first number if the associated pixel is determined to be similar to the corresponding pixel in the temporally preceding digital picture according to a second similarity criterion, and each map value is set to be a second number if the associated pixel is determined to not be similar with the corresponding pixel in the temporally preceding digital picture according to the second similarity criterion;
- determining, for each pixel, whether the pixel is similar with the corresponding pixel in the temporally preceding digital picture according to the first similarity criterion which is based on the motion map value associated with the pixel and motion map values associated with pixels adjacent to the pixel.

11. The method according to claim 10, wherein according to the first similarity criterion, for each pixel,
- a sum of the motion map value associated with the pixel and motion map values associated with pixels adjacent to the pixel is compared with a third threshold, and
- the pixel is determined to be similar to the corresponding pixel in the temporally preceding digital picture if the sum is larger than the first pre-determined value, and
- the pixel is determined not to be similar to the corresponding pixel in the temporally preceding digital picture if the sum is smaller than the third threshold.

12. The method according to claim 10, wherein according to the second similarity criterion, for each pixel,
- a difference value between the pixel and the corresponding pixel in the temporally preceding digital picture is determined, and
- the pixel is determined to be similar to the corresponding pixel in the temporally preceding digital picture if the difference value is smaller than a fourth threshold, and
- the pixel is determined not to be similar to the corresponding pixel in the temporally preceding digital picture if the difference value is larger than the fourth threshold.

13. A device for processing a digital picture, the digital picture comprising a plurality of pixels, the device comprising:
- a dividing unit for dividing the digital picture into a plurality of blocks, each block comprising a plurality of pixels;
- a determining unit for determining a type of block for each block;
- an associating unit for associating each block with a filtering mode of a plurality of different filtering modes according to the type determined for the block; and
- a filtering unit for filtering each block using the associated filtering mode associated with the block,
- wherein the type of a block is determined based on a characteristic value of the block, and
- wherein the block is determined to be an edge type if the characteristic value of the block is larger than a first threshold;
- the block is determined to be of a texture type if the characteristic value of the block is between the first threshold and a second threshold, the second threshold being smaller than the first threshold; and
- the block is determined to be of a homogeneous type if the characteristic value of the block is smaller than the second threshold.

14. A non-transitory computer readable medium having a program recorded thereon, wherein the program is executed to make a computer process a digital picture, the digital picture comprising a plurality of pixels, the computer readable medium comprising:
- instructions for dividing the digital picture into a plurality of blocks, each block comprising a plurality of pixels;
- instructions for determining a type of block for each block;
- instructions for associating each block with a filtering mode of a plurality of different filtering modes according to the type determined for the block; and
- instructions for filtering each block using the associated filtering mode associated with the block;
- wherein the type of a block is determined based on a characteristic value of the block, and
- wherein the block is determined to be of an edge type if the characteristic value of the block is larger than a first threshold;
- the block is determined to be of a texture type if the characteristic value of the block is between the first threshold and a second threshold, the second threshold being smaller than the first threshold; and
- the block is determined to be of a homogeneous type if the characteristic value of the block is smaller than the second threshold.

* * * * *